United States Patent
Li et al.

(10) Patent No.: US 9,998,293 B2
(45) Date of Patent: Jun. 12, 2018

(54) METHOD AND DEVICE FOR MAINTAINING MULTICAST GROUP MEMBER

(71) Applicant: Huawei Technologies Co., Ltd., Shenzhen (CN)

(72) Inventors: Chenji Li, Hangzhou (CN); Quancai Li, Hangzhou (CN); Bo Man, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days. days.

(21) Appl. No.: 15/335,620

(22) Filed: Oct. 27, 2016

(65) Prior Publication Data

US 2017/0048076 A1 Feb. 16, 2017

Related U.S. Application Data

(63) Continuation of application No. PCT/CN2015/070044, filed on Jan. 4, 2015.

(30) Foreign Application Priority Data

Apr. 28, 2014 (CN) .......................... 2014 1 0175802

(51) Int. Cl.
*H04L 12/18* (2006.01)
*H04L 12/851* (2013.01)
(Continued)

(52) U.S. Cl.
CPC .......... *H04L 12/185* (2013.01); *H04L 12/18* (2013.01); *H04L 41/0816* (2013.01);
(Continued)

(58) Field of Classification Search
CPC ... H04L 47/806; H04L 65/4076; H04L 12/18; G06F 15/16; G06F 17/30569
(Continued)

(56) References Cited

U.S. PATENT DOCUMENTS 6,223,286 B1 * 4/2001 Hashimoto ......... H04L 12/1868
380/280
7,203,492 B2 * 4/2007 Momona ................. H04L 12/18
370/310.2
(Continued)

FOREIGN PATENT DOCUMENTS

CN 101110730 A 1/2008
CN 101184044 A 5/2008
(Continued)

OTHER PUBLICATIONS

Foreign Communication From a Counterpart Application, PCT Application No. PCT/CN2015/070044, International Search Report dated Apr. 14, 2015, 3 pages.
(Continued)

*Primary Examiner* — Tesfay Yohannes
(74) *Attorney, Agent, or Firm* — Conley Rose, P.C.

(57) ABSTRACT

A method and a device for maintaining a multicast group member are disclosed. The method includes sending a query message to a switch at intervals of a preset period, so that the switch sends the query message to each multicast group member included in a multicast group; acquiring a count value of current period query responses received by the switch in a current period; and maintaining, according to the count value of current period query responses and a count value of previous period query responses, the multicast group member included in the multicast group. The device includes a first sending module, an acquiring module, and a maintenance module. In the present disclosure, a multicast group member is maintained using a flow table maintained in a switch, which decreases load of a controller, and improves processing efficiency of maintaining, by the controller, the multicast group member.

12 Claims, 5 Drawing Sheets

(51) Int. Cl.
*H04L 12/931* (2013.01)
*H04L 29/12* (2006.01)
*H04L 12/24* (2006.01)

(52) U.S. Cl.
CPC ........ *H04L 47/2483* (2013.01); *H04L 49/201* (2013.01); *H04L 61/2069* (2013.01); *H04L 41/5051* (2013.01)

(58) Field of Classification Search
USPC ................. 709/223, 224; 370/328, 390, 392
See application file for complete search history.

(56) References Cited

U.S. PATENT DOCUMENTS

| | | | |
|---|---|---|---|
| 2007/0248088 A1* | 10/2007 | Lim | H04W 72/005 370/390 |
| 2009/0073910 A1* | 3/2009 | Yagyu | H04L 45/16 370/312 |
| 2009/0147786 A1* | 6/2009 | Li | H04L 12/185 370/390 |
| 2009/0196213 A1* | 8/2009 | Zhong | H04W 36/06 370/312 |
| 2010/0195651 A1* | 8/2010 | Dayong | H04L 12/1886 370/390 |
| 2012/0307727 A1* | 12/2012 | Yamada | H04L 45/586 370/328 |
| 2013/0128886 A1 | 5/2013 | Shah | |
| 2013/0304915 A1* | 11/2013 | Kawai | H04L 43/026 709/224 |
| 2013/0322443 A1 | 12/2013 | Dunbar et al. | |
| 2013/0343393 A1* | 12/2013 | Sugihara | H04L 47/193 370/392 |
| 2015/0282157 A1* | 10/2015 | Kim | H04W 48/14 370/329 |

FOREIGN PATENT DOCUMENTS

| | | | |
|---|---|---|---|
| CN | 101388788 | A | 3/2009 |
| CN | 101409704 | A | 4/2009 |
| CN | 101442711 | A | 5/2009 |
| CN | 102170364 | A | 8/2011 |
| CN | 103248724 | A | 8/2013 |
| CN | 103346969 | A | 10/2013 |
| JP | 2006148750 | A | 6/2006 |
| JP | 2006287818 | A | 10/2006 |
| JP | 2008160718 | A | 7/2008 |
| JP | 2011523315 | A | 8/2011 |
| WO | 2013008134 | A2 | 1/2013 |
| WO | 2014041550 | A1 | 3/2014 |
| WO | 2014057403 | A1 | 4/2014 |

OTHER PUBLICATIONS

Foreign Communication From a Counterpart Application, PCT Application No. PCT/CN2015/070044, Written Opinion dated Apr. 14, 2015, 4 pages.
Asaeda, H., et al., "IGMP/MLD Explicit Membership Tracking Function for Multicast Routers," draft-ietf-pim-explicit-tracking-09, Dec. 3, 2013, 10 pages.
Ge, J., et al., "An OpenFlow-Based Dynamic Path Adjustment Algorithm for Multicast Spanning Trees," 12th IEEE International Conference on Trust, Security and Privacy in Computing and Communications, 2013, pp. 1478-1483.
Li, X., et al., "Scaling IP Multicast on Datacenter Topologies," Dec. 9-12, 2013, 12 pages.
Foreign Communication From a Counterpart Application, European Application No. 15785811.9, Extended European Search Report dated Mar. 22, 2017, 12 pages.
"OpenFlow Switch Specification," Open Networking Foundation, Version 1.3.4 (Protocol version 0x04), Mar. 27, 2014, 171 pages.
Foreign Communication From a Counterpart Application, Chinese Application No. 201410175802.6, Chinese Search Report dated Oct. 15, 2014, 5 pages.
Foreign Communication From a Counterpart Application, PCT Application No. PCT/CN2015/070044, English Translation of International Search Report dated Apr. 14, 2015, 2 pages.
Foreign Communication From a Counterpart Application, PCT Application No. PCT/CN2015/070044, English Translation of Written Opinion dated Apr. 14, 2015, 5 pages.
Machine Translation and Abstract of Japanese Publication No. JP2006287818, Oct. 19, 2006, 27 pages.
Machine Translation and Abstract of Japanese Publication No. JP2008160718, Jul. 10, 2008, 15 pages.
Foreign Communication From a Counterpart Application, Japanese Application No. 2016-562204, Japanese Office Action dated May 19, 2017, 1 page.
Foreign Communication From a Counterpart Application, Japanese Application No. 2016-562204, English Translation of Japanese Office Action dated May 23, 2017, 3 page.
Machine Translation and Abstract of Chinese Publication No. CN101110730, Jan. 23, 2008, 14 pages.
Machine Translation and Abstract of Chinese Publication No. CN101184044, May 21, 2008, 11 pages.
Machine Translation and Abstract of Chinese Publication No. CN101388788, Mar. 18, 2009, 29 pages.
Machine Translation and Abstract of Chinese Publication No. CN101409704, Apr. 15, 2009, 20 pages.
Foreign Communication From a Counterpart Application, Chinese Application No. 201410175802.6, Chinese Office Action dated Nov. 6, 2017, 7 pages.

\* cited by examiner

METHOD AND DEVICE FOR MAINTAINING MULTICAST GROUP MEMBER

CROSS-REFERENCE TO RELATED APPLICATIONS

This application is a continuation of International Application No. PCT/CN2015/070044, filed on Jan. 4, 2015, which claims priority to Chinese Patent Application No. 201410175802.6, filed on Apr. 28, 2014. The disclosures of the aforementioned applications are hereby incorporated by reference in their entireties.

TECHNICAL FIELD

The present disclosure relates to the Internet field, and in particular, to a method and a device for maintaining a multicast group member.

BACKGROUND

A software defined networking (SDN) network includes a controller, a switch, and a host. Multiple hosts may all join one multicast group, and one host may join multiple multicast groups at the same time. A host joining a multicast group may be referred to as a multicast group member. When multicast communication is implemented, the switch is responsible for forwarding data streams between the controller and multicast group members, and the controller maintains a multicast group member that joins and leaves the multicast group, to control forwarding paths of data streams.

Currently, a process of maintaining a multicast group member includes the following. The controller sends a general query message to the switch, and the switch receives the general query message, and sends the general query message to a multicast group member included in the multicast group. When receiving the general query message, the multicast group member generates a query response message for each multicast group that the multicast group member joins, and sends the generated query response message to the switch, and the switch sends the query response message to the controller. When receiving the query response message, the controller processes the query response message, to determine whether the multicast group member changes, so as to maintain the multicast group member in the multicast group.

The controller periodically sends a general query message to each multicast group member included in a multicast group, and when the multicast group includes a relatively large quantity of multicast group members, the controller periodically receives a relatively large quantity of query response messages. Therefore, load of the controller is increased, and processing efficiency of the controller is reduced.

SUMMARY

To resolve a problem in the prior art, embodiments of the present disclosure provide a method and a device for maintaining a multicast group member. Technical solutions are as follows.

According to a first aspect, a method for maintaining a multicast group member is provided, where the method includes sending a query message to a switch at intervals of a preset period, so that the switch sends the query message to each multicast group member included in a multicast group; acquiring a count value of current period query responses received by the switch in a current period; and maintaining, according to the count value of current period query responses and a count value of previous period query responses, the multicast group member included in the multicast group.

With reference to the first aspect, in a first possible implementation manner of the first aspect, the acquiring a count value of current period query responses received by the switch in a current period includes sending a flow entry query message to the switch, where the flow entry query message carries a target flow table identifier and a target flow entry identifier, so that the switch queries for a query response count value corresponding to both the target flow table identifier and the target flow entry identifier; and receiving the query response count value sent by the switch, and determining the received query response count value as the count value of current period query responses.

With reference to the first aspect or the first possible implementation manner of the first aspect, in a second possible implementation manner of the first aspect, the maintaining, according to the count value of current period query responses and a count value of previous period query responses, the multicast group member included in the multicast group includes acquiring a preset query response count value increment corresponding to the multicast group; calculating a difference between the count value of current period query responses and the count value of previous period query responses; and maintaining, according to the difference and the preset query response count value increment, the multicast group member included in the multicast group.

With reference to the second possible implementation manner of the first aspect, in a third possible implementation manner of the first aspect, the maintaining, according to the difference and the preset query response count value increment, the multicast group member included in the multicast group includes, if the difference is less than the preset query response count value increment, determining that there exists a multicast group member abnormally leaving the multicast group; and acquiring a port number corresponding to the multicast group member that abnormally leaves, and deleting the acquired port number from a multicast path.

With reference to the third possible implementation manner of the first aspect, in a fourth possible implementation manner of the first aspect, the acquiring a port number corresponding to the multicast group member that abnormally leaves includes sending a deletion message to the switch, where the deletion message carries a multicast group address, so that the switch deletes a flow entry corresponding to the multicast group address; sending the query message to the switch, where the query message carries a multicast group address of the multicast group, so that the switch sends the query message to each multicast group member included in the multicast group; receiving at least one second query response reported by the switch, where the at least one second query response is obtained by separately encapsulating at least one first query response, the at least one first query response is sent according to the query message by the multicast group member included in the multicast group, and the at least one second query response each carries a multicast group address and a port number; acquiring a corresponding port number from a stored correspondence between a multicast group address and a port number according to the multicast group address; and comparing the acquired port number with the port number carried by the at least one second query response, to determine the port number corresponding to the multicast group member that abnormally leaves.

With reference to the first aspect, the first possible implementation manner of the first aspect, the second possible implementation manner of the first aspect, the third possible implementation manner of the first aspect, or the fourth possible implementation manner of the first aspect, in a fifth possible implementation manner of the first aspect, the method further includes receiving a first multicast join message sent by the multicast group member, where the first multicast join message carries a multicast group address; creating a flow entry for the multicast group member according to the multicast group address and a port number that corresponds to the multicast group member; and sending the flow entry to the switch, so that the switch stores the flow entry in a corresponding flow table.

According to a second aspect, a method for maintaining a multicast group member is provided, where the method includes receiving, at intervals of a preset period, a query message sent by a controller, and sending the query message to each multicast group member included in a multicast group; receiving a first query response sent by the multicast group member, where the first query response carries a multicast group address; if a stored flow table includes the multicast group address and a flow entry in which a port number corresponding to the multicast group member is located, discarding the first query response, and acquiring a count value of current period query responses according to a quantity of the first query responses; and sending the count value of current period query responses to the controller, so that the controller maintains, according to the count value of current period query responses and a count value of previous period query responses, the multicast group member included in the multicast group.

With reference to the second aspect, in a first possible implementation manner of the second aspect, the sending the count value of current period query responses to the controller includes receiving a flow entry query message sent by the controller, where the flow entry query message carries a target flow table identifier and a target flow entry identifier; acquiring a corresponding query response count value from the stored flow table according to the target flow table identifier and the target flow entry identifier; and using the acquired query response count value as the count value of current period query responses and sending the count value of current period query responses to the controller.

With reference to the second aspect or the first possible implementation manner of the second aspect, in a second possible implementation manner of the second aspect, after the sending the count value of current period query responses to the controller, the method further includes, when the controller determines that there exists a multicast group member abnormally leaving the multicast group, receiving a deletion message sent by the controller, where the deletion message carries a multicast group address, and deleting a corresponding flow entry from the flow table according to the multicast group address; when the query message sent by the controller is received, sending the query message to each multicast group member included in the multicast group, where the query message carries a multicast group address of the multicast group; receiving at least one first query response sent by the multicast group member included in the multicast group, where the at least one first query response each carries a multicast group address; separately encapsulating the at least one first query response, to obtain at least one second query response, where the at least one second query response each carries the multicast group address and a port number that corresponds to the multicast group member; and sending the at least one second query response to the controller, so that the controller acquires a port number corresponding the multicast group member that abnormally leaves, and deleting the acquired port number from a multicast path.

With reference to the second aspect, the first possible implementation manner of the second aspect, or the second possible implementation manner of the second aspect, in a third possible implementation manner of the second aspect, before the receiving a first query response sent by the multicast group member, the method further includes receiving a first multicast join message sent by the multicast group member, where the first multicast join message carries a multicast group address; encapsulating the first multicast join message, to obtain a second multicast join message, where the second multicast join message carries the multicast group address and a port number; sending the second multicast join message to the controller, so that the controller creates a flow entry for the multicast group member according to the second multicast join message; and receiving the flow entry sent by the controller, and storing the flow entry in the flow table.

With reference to the second aspect, the first possible implementation manner of the second aspect, the second possible implementation manner of the second aspect, or the third possible implementation manner of the second aspect, in a fourth possible implementation manner of the first aspect, the method further includes receiving a first multicast leave message sent by a multicast group member, where the first multicast leave message carries a multicast group address; deleting a corresponding flow entry from the flow table according to the multicast group address and a port number that corresponds to the multicast group member; encapsulating the first multicast leave message, to obtain a second multicast leave message, where the second multicast leave message carries the multicast group address and the port number; and sending the second multicast leave message to the controller, so that the controller deletes the port number from the multicast path.

According to a third aspect, a device for maintaining a multicast group member is provided, where the device includes a first sending module configured to send a query message to a switch at intervals of a preset period, so that the switch sends the query message to each multicast group member included in a multicast group; an acquiring module configured to acquire a count value of current period query responses received by the switch in a current period; and a maintenance module configured to maintain, according to the count value of current period query responses and a count value of previous period query responses, the multicast group member included in the multicast group.

With reference to the third aspect, in a first possible implementation manner of the third aspect, the acquiring module includes a first sending unit configured to send a flow entry query message to the switch, where the flow entry query message carries a target flow table identifier and a target flow entry identifier, so that the switch queries for a query response count value corresponding to both the target flow table identifier and the target flow entry identifier; and a first receiving unit configured to receive the query response count value sent by the switch, and determine the received query response count value as the count value of current period query responses.

With reference to the third aspect or the first possible implementation manner of the third aspect, in a second possible implementation manner of the third aspect, the maintenance module includes a first acquiring unit configured to acquire a preset query response count value increment corresponding to the multicast group; a calculation unit configured to calculate a difference between the count value of current period query responses and the count value of previous period query responses; and a maintenance unit configured to maintain, according to the difference and the preset query response count value increment, the multicast group member included in the multicast group.

With reference to the second possible implementation manner of the third aspect, in a third possible implementation manner of the third aspect, the maintenance unit includes a determining subunit configured to, if the difference is less than the preset query response count value increment, determine that there exists a multicast group member abnormally leaving the multicast group; and a deletion subunit configured to acquire a port number corresponding to the multicast group member that abnormally leaves, and delete the acquired port number from a multicast path.

With reference to the third possible implementation manner of the third aspect, in a fourth possible implementation manner of the third aspect, the deletion subunit is configured to send a deletion message to the switch, where the deletion message carries a multicast group address, so that the switch deletes a flow entry corresponding to the multicast group address; send the query message to the switch, where the query message carries a multicast group address of the multicast group, so that the switch sends the query message to each multicast group member included in the multicast group; receive at least one second query response reported by the switch, where the at least one second query response is obtained by separately encapsulating at least one first query response, the at least one first query response is sent according to the query message by the multicast group member included in the multicast group, and the at least one second query response each carries a multicast group address and a port number; acquire a corresponding port number from a stored correspondence between a multicast group address and a port number according to the multicast group address; and compare the acquired port number with the port number carried by the at least one second query response, to determine the port number corresponding to the multicast group member that abnormally leaves.

With reference to the third aspect, the first possible implementation manner of the third aspect, the second possible implementation manner of the third aspect, the third possible implementation manner of the third aspect, or the fourth possible implementation manner of the third aspect, in a fifth possible implementation manner of the third aspect, the device further includes a first receiving module configured to receive a first multicast join message sent by the multicast group member, where the first multicast join message carries a multicast group address; a creation module configured to create a flow entry for the multicast group member according to the multicast group address and a port number that corresponds to the multicast group member; and a second sending module configured to send the flow entry to the switch, so that the switch stores the flow entry in a corresponding flow table.

According to a fourth aspect, a device for maintaining a multicast group member is provided, where the device includes a second receiving module configured to receive, at intervals of a preset period, a query message sent by a controller, and send the query message to each multicast group member included in a multicast group; a third receiving module configured to receive a first query response sent by the multicast group member, where the first query response carries a multicast group address; a discarding module configured to, if a stored flow table includes the multicast group address and a flow entry in which a port number corresponding to the multicast group member is located, discard the first query response, and acquire a count value of current period query responses according to a quantity of the first query responses; and a third sending module configured to send the count value of current period query responses to the controller, so that the controller maintains, according to the count value of current period query responses and a count value of previous period query responses, the multicast group member included in the multicast group.

With reference to the fourth aspect, in a first possible implementation manner of the fourth aspect, the third sending module includes a second receiving unit configured to receive a flow entry query message sent by the controller, where the flow entry query message carries a target flow table identifier and a target flow entry identifier; a second acquiring unit configured to acquire a corresponding query response count value from the stored flow table according to the target flow table identifier and the target flow entry identifier; and a second sending unit configured to use the acquired query response count value as the count value of current period query responses and send the count value of current period query responses to the controller.

With reference to the fourth aspect or the first possible implementation manner of the fourth aspect, in a second possible implementation manner of the fourth aspect, the device further includes a first deletion module configured to, when the controller determines that there exists a multicast group member abnormally leaving the multicast group, receive a deletion message sent by the controller, where the deletion message carries a multicast group address, and delete a corresponding flow entry from the flow table according to the multicast group address; a fourth sending module configured to, when the query message sent by the controller is received, send the query message to each multicast group member included in the multicast group, where the query message carries a multicast group address of the multicast group; a fourth receiving module configured to receive at least one first query response sent by the multicast group member included in the multicast group, where the at least one first query response each carries a multicast group address; a first encapsulation module configured to separately encapsulate the at least one first query response, to obtain at least one second query response, where the at least one second query response each carries the multicast group address and a port number that corresponds to the multicast group member; and a fifth sending module configured to send the at least one second query response to the controller, so that the controller acquires a port number corresponding the multicast group member that abnormally leaves, and delete the acquired port number from a multicast path.

With reference to the fourth aspect, the first possible implementation manner of the fourth aspect, or the second possible implementation manner of the fourth aspect, in a third possible implementation manner of the fourth aspect, the device further includes a fifth receiving module configured to receive a first multicast join message sent by the multicast group member, where the first multicast join message carries a multicast group address and a port number; a second encapsulation module configured to encapsulate the first multicast join message, to obtain a second multicast join message, where the second multicast join message carries the multicast group address and a port number; a sixth sending module configured to send the second multicast join message to the controller, so that the controller creates a flow entry for the multicast group member according to the second multicast join message; and a storage module configured to receive the flow entry sent by the controller, and store the flow entry in the flow table.

With reference to the fourth aspect, the first possible implementation manner of the fourth aspect, the second possible implementation manner of the fourth aspect, or the third possible implementation manner of the fourth aspect, in a fourth possible implementation manner of the fourth aspect, the device further includes a sixth receiving module configured to receive a first multicast leave message sent by a multicast group member, where the first multicast leave message carries a multicast group address; a second deletion module configured to delete a corresponding flow entry from the flow table according to the multicast group address and a port number that corresponds to the multicast group member; a third encapsulation module configured to encapsulate the first multicast leave message, to obtain a second multicast leave message, where the second multicast leave message carries the multicast group address and the port number; and a seventh sending module configured to send the second multicast leave message to the controller, so that the controller deletes the port number from the multicast path.

The technical solutions provided in the embodiments of the present disclosure bring the following advantageous effects. In the embodiments of the present disclosure, when a controller maintains a multicast group member included in the multicast group, the controller sends a query message to a switch, so that the switch sends the query message to each multicast group member included in the multicast group. When receiving a first query response sent by the multicast group member, the switch queries, according to a multicast group address carried by the first query response and a port number that corresponds to the multicast group member, for a corresponding flow entry in a flow table maintained by the switch. If the corresponding flow entry is found, the switch discards the first query response, omitting sending the query response to the controller. The controller does not need to periodically process a relatively large quantity of query responses, which reduces load of the controller. The controller acquires, from the switch, a count value, corresponding to the multicast group address, of current period query responses in a current period, and determines, according to the count value of current period query responses and a count value of previous period query responses, whether the multicast group member included in the multicast group changes. In this way, when the multicast group member does not change, determining may be quickly performed by directly using the count value of current period query responses and the count value of previous period query responses, thereby improving efficiency of maintaining the multicast group member. When the multicast group member changes, determining is then performed according to the first query response sent by the multicast group member, and the controller needs to process only query responses in the current period, which also reduces load of the controller.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the embodiments of the present disclosure in detail with reference to the accompanying drawings.

Figure 1:
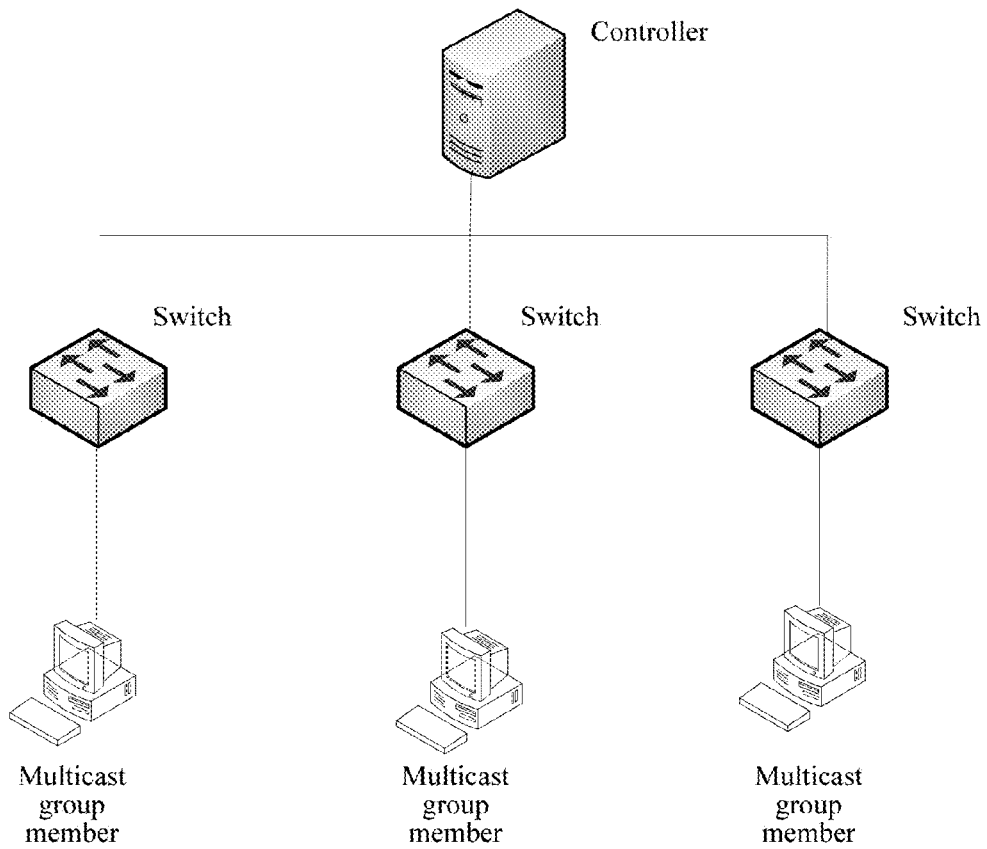
FIG. 1 is an architectural diagram of a system for maintaining a multicast group member according to an embodiment of the present disclosure.

FIG. 1 is an architectural diagram of a system for maintaining a multicast group member according to an embodiment of the present disclosure. The system for maintaining a multicast group member includes a controller, a switch, and a host. Multiple hosts may be connected to one switch, the multiple hosts may all join one multicast group, one host may join multiple multicast groups at the same time, and a host joining a multicast group may be referred to as a multicast group member. The controller may send a query message to the switch, and the switch sends the query message to a multicast group member included in a multicast group. The switch receives a first query response sent by the multicast group member included in the multicast group, and encapsulates the first query response, to obtain a second query response. The controller determines, according to the second query response, whether the multicast group member included in the multicast group changes, to maintain the multicast group member included in the multicast group. In this embodiment of the present disclosure, a flow table is maintained in the switch, and the flow table includes at least a correspondence between a multicast group address and a port number and a correspondence between a multicast group address and a query response count value. When the switch receives the first query response sent by the multicast group member, where the first query response carries a multicast group address, the switch acquires a port number corresponding to the multicast group member. If the flow table maintained by the switch includes a correspondence between the multicast group address and the acquired port number, the switch does not send the second query response to the controller, and increases a query response count value corresponding to the multicast group address, to obtain a count value of current period query responses. The controller determines, according to the count value of current period query responses and a count value of previous period query responses, whether the multicast group member included in the multicast group changes. For a specific implementation process of maintaining a multicast group member, refer to the following embodiments for details.

Figure 2:
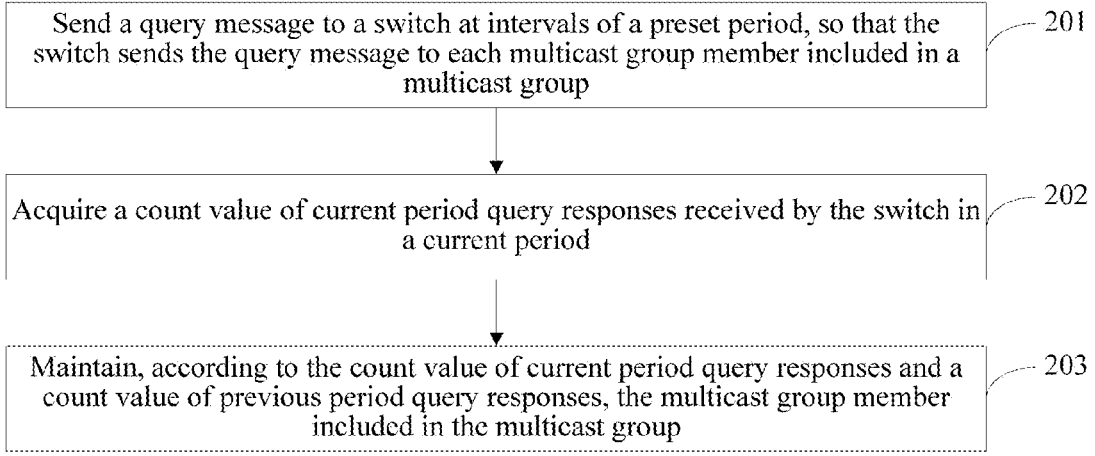
FIG. 2 is a flowchart of a method for maintaining a multicast group member according to an embodiment of the present disclosure.

FIG. 2 is a flowchart of a method for maintaining a multicast group member according to an embodiment of the present disclosure. Referring to FIG. 2, the method includes the following steps.

Step 201: Send a query message to a switch at intervals of a preset period, so that the switch sends the query message to each multicast group member included in a multicast group.

Step 202: Acquire a count value of current period query responses received by the switch in a current period.

Step 203: Maintain, according to the count value of current period query responses and a count value of previous period query responses, the multicast group member included in the multicast group.

Optionally, the acquiring a count value of current period query responses received by the switch in a current period includes sending a flow entry query message to the switch, where the flow entry query message carries a target flow table identifier and a target flow entry identifier, so that the switch queries for a query response count value corresponding to both the target flow table identifier and the target flow entry identifier; and receiving the query response count value sent by the switch, and determining the received query response count value as the count value of current period query responses.

Optionally, the maintaining, according to the count value of current period query responses and a count value of previous period query responses, the multicast group member included in the multicast group includes acquiring a preset query response count value increment corresponding to the multicast group; calculating a difference between the count value of current period query responses and the count value of previous period query responses; and maintaining, according to the difference and the preset query response count value increment, the multicast group member included in the multicast group.

Optionally, the maintaining, according to the difference and the preset query response count value increment, the multicast group member included in the multicast group includes, if the difference is less than the preset query response count value increment, determining that there exists a multicast group member abnormally leaving the multicast group; and acquiring a port number corresponding to the multicast group member that abnormally leaves, and deleting the acquired port number from a multicast path.

Optionally, the acquiring a port number corresponding to the multicast group member that abnormally leaves includes sending a deletion message to the switch, where the deletion message carries a multicast group address, so that the switch deletes a flow entry corresponding to the multicast group address; sending the query message to the switch, where the query message carries a multicast group address of the multicast group, so that the switch sends the query message to each multicast group member included in the multicast group; receiving at least one second query response reported by the switch, where the at least one second query response is obtained by separately encapsulating at least one first query response, the at least one first query response is sent according to the query message by the multicast group member included in the multicast group, and the at least one second query response each carries a multicast group address and a port number; acquiring a corresponding port number from a stored correspondence between a multicast group address and a port number according to the multicast group address; and comparing the acquired port number with the port number carried by the at least one second query response, to determine the port number corresponding to the multicast group member that abnormally leaves.

Further, the method further includes receiving a first multicast join message sent by the multicast group member, where the first multicast join message carries a multicast group address; creating a flow entry for the multicast group member according to the multicast group address and a port number that corresponds to the multicast group member; and sending the flow entry to the switch, so that the switch stores the flow entry in a corresponding flow table.

In this embodiment of the present disclosure, when a controller maintains a multicast group member included in the multicast group, the controller sends a query message to a switch, so that the switch sends the query message to each multicast group member included in the multicast group. When receiving a first query response sent by the multicast group member, the switch queries, according to a multicast group address carried by the first query response and a port number that corresponds to the multicast group member, for a corresponding flow entry in a flow table maintained by the switch. If the corresponding flow entry is found, the switch discards the first query response, omitting sending the query response to the controller. The controller does not need to periodically process a relatively large quantity of query responses, which reduces load of the controller. The controller acquires, from the switch, a count value, corresponding to the multicast group address, of current period query responses in a current period, and determines, according to the count value of current period query responses and a count value of previous period query responses, whether the multicast group member included in the multicast group changes. In this way, when the multicast group member does not change, determining may be quickly performed by directly using the count value of current period query responses and the count value of previous period query responses, thereby improving efficiency of maintaining the multicast group member. When the multicast group member changes, determining is then performed according to the first query response sent by the multicast group member; and the controller needs to process only query responses in the current period, which also reduces load of the controller.

Figure 3:
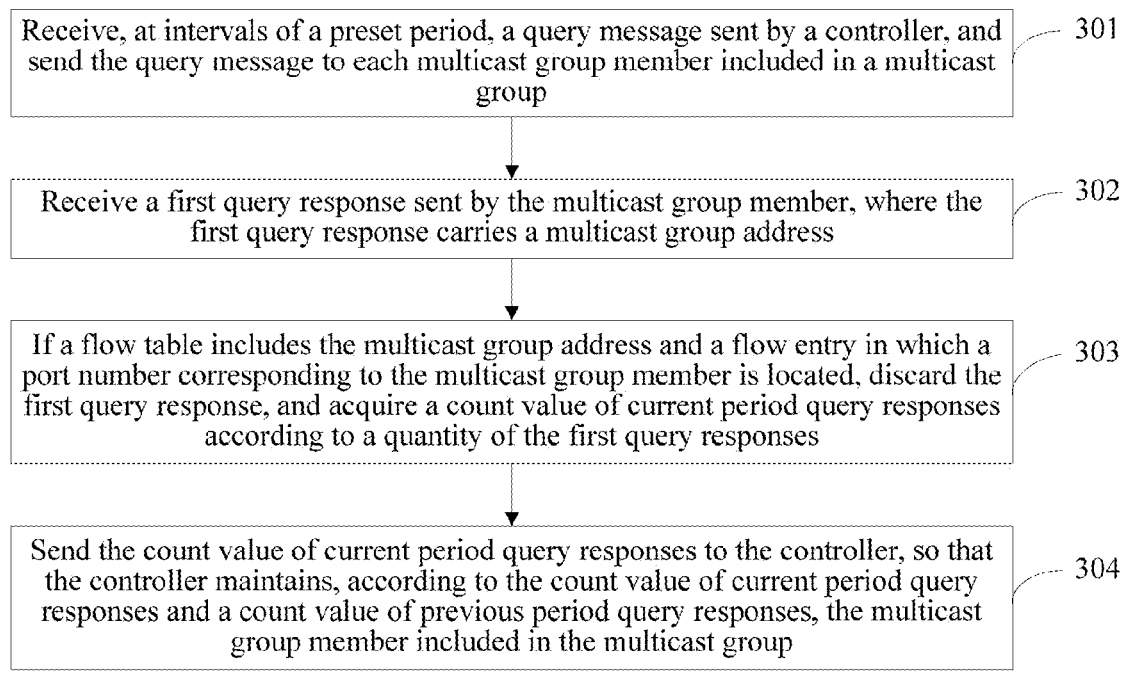
FIG. 3 is a flowchart of another method for maintaining a multicast group member according to an embodiment of the present disclosure.

FIG. 3 is a flowchart of a method for maintaining a multicast group member according to an embodiment of the present disclosure. Referring to FIG. 3, the method includes the following steps.

Step 301: Receive, at intervals of a preset period, a query message sent by a controller, and send the query message to each multicast group member included in a multicast group.

Step 302: Receive a first query response sent by the multicast group member, where the first query response carries a multicast group address.

Step 303: If a stored flow table includes the multicast group address and a flow entry in which a port number corresponding to the multicast group member is located, discard the first query response, and acquire a count value of current period query responses according to a quantity of the first query responses.

Step 304: Send the count value of current period query responses to the controller, so that the controller maintains, according to the count value of current period query responses and a count value of previous period query responses, the multicast group member included in the multicast group.

Optionally, the sending the count value of current period query responses to the controller includes: receiving a flow entry query message sent by the controller, where the flow entry query message carries a target flow table identifier and a target flow entry identifier; acquiring a corresponding query response count value from the stored flow table according to the target flow table identifier and the target flow entry identifier; and using the acquired query response count value as the count value of current period query responses and sending the count value of current period query responses to the controller.

Optionally, after the sending the count value of current period query responses to the controller, the method further includes, when the controller determines that there exists a multicast group member abnormally leaving the multicast group, receiving a deletion message sent by the controller, where the deletion message carries a multicast group address, and deleting a corresponding flow entry from the flow table according to the multicast group address; when the query message sent by the controller is received, sending the query message to each multicast group member included in the multicast group, where the query message carries a multicast group address of the multicast group; receiving at least one first query response sent by the multicast group member included in the multicast group, where the at least one first query response each carries a multicast group address; separately encapsulating the at least one first query response, to obtain at least one second query response, where the at least one second query response each carries the multicast group address and a port number that corresponds to the multicast group member; and sending the at least one second query response to the controller, so that the controller acquires a port number corresponding the multicast group member that abnormally leaves, and deleting the acquired port number from a multicast path.

Optionally, before the receiving a first query response sent by the multicast group member, the method further includes receiving a first multicast join message sent by the multicast group member, where the first multicast join message carries a multicast group address; encapsulating the first multicast join message, to obtain a second multicast join message, where the second multicast join message carries the multicast group address and a port number; sending the second multicast join message to the controller, so that the controller creates a flow entry for the multicast group member according to the second multicast join message; and receiving the flow entry sent by the controller, and storing the flow entry in the flow table.

Further, the method further includes receiving a first multicast leave message sent by a multicast group member, where the first multicast leave message carries a multicast group address; deleting a corresponding flow entry from the flow table according to the multicast group address and a port number that corresponds to the multicast group member; encapsulating the first multicast leave message, to obtain a second multicast leave message, where the second multicast leave message carries the multicast group address and the port number; and sending the second multicast leave message to the controller, so that the controller deletes the port number from the multicast path.

In this embodiment of the present disclosure, when a controller maintains a multicast group member included in the multicast group, the controller sends a query message to a switch, so that the switch sends the query message to each multicast group member included in the multicast group. When receiving a first query response sent by the multicast group member, the switch queries, according to a multicast group address carried by the first query response and a port number that corresponds to the multicast group member, for a corresponding flow entry in a flow table maintained by the switch. If the corresponding flow entry is found, the switch discards the first query response, omitting sending the query response to the controller. The controller does not need to periodically process a relatively large quantity of query responses, which reduces load of the controller. The controller acquires, from the switch, a count value, corresponding to the multicast group address, of current period query responses in a current period, and determines, according to the count value of current period query responses and a count value of previous period query responses, whether the multicast group member included in the multicast group changes. In this way, when the multicast group member does not change, determining may be quickly performed by directly using the count value of current period query responses and the count value of previous period query responses, thereby improving efficiency of maintaining the multicast group member. When the multicast group member changes, determining is then performed according to the first query response sent by the multicast group member; and the controller needs to process only query responses in the current period, which also reduces load of the controller.

Figure 4:
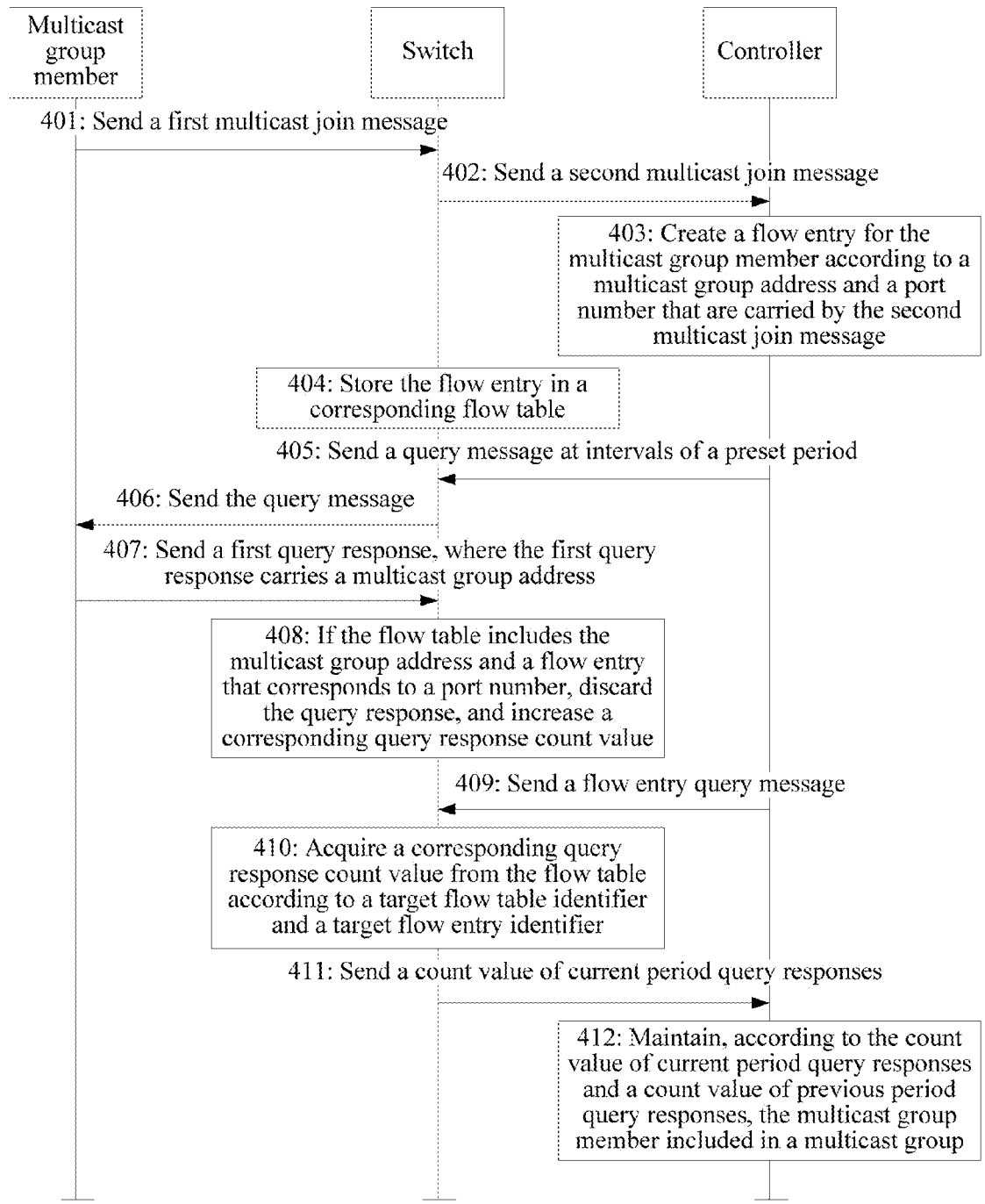
FIG. 4 is a flowchart of another method for maintaining a multicast group member according to an embodiment of the present disclosure.

FIG. 4 is a flowchart of a method for maintaining a multicast group member according to an embodiment of the present disclosure. Referring to FIG. 4, the method includes the following steps.

Step 401: A multicast group member sends a first multicast join message to a switch, where the first multicast join message carries a multicast group address.

When a host joins the multicast group, the host may be referred to as a multicast group member. The multicast group member sends the first multicast join message to the switch, where the first multicast join message may be sent in a form of a multicast join data packet, or certainly, the first multicast join message may be sent in another form, which is not limited in the present disclosure.

It should be noted that the multicast group includes a multicast source and a multicast receiver. In this embodiment of the present disclosure, the multicast receiver is a multicast group member, the multicast source is connected to the controller, so that the controller forwards a data stream sent by the multicast source, and the multicast group address is an address of the multicast source. Because the multicast source is not involved in the present disclosure, the multicast source is not shown in this embodiment of the present disclosure.

Step 402: The switch receives the first multicast join message, encapsulates the first multicast join message, to obtain a second multicast join message, and sends the second multicast join message to a controller, where the second multicast join message carries the multicast group address and a port number.

The switch receives the first multicast join message, and acquires a port number corresponding to the multicast group member. The first multicast join message is encapsulated, to obtain the second multicast join message, where the second multicast join message carries the multicast group address and the acquired port number. The switch sends the second multicast join message to the controller.

The switch may encapsulate the multicast join data packet according to an OpenFlow network protocol, where the OpenFlow network protocol is a protocol for implementing an SDN.

When the first multicast join message is sent in a form of a multicast join data packet, to enable the controller to identify the multicast join data packet, the switch further needs to encapsulate the multicast join data packet according to the OpenFlow network protocol, and sends an encapsulated multicast join data packet to the controller.

The port number corresponding to the multicast group member is a port number of a port using which the multicast group member is connected to the switch.

Step 403: The controller receives the second multicast join message, creates a flow entry for the multicast group member according to the multicast group address and the port number that are carried by the second multicast join message, and sends the flow entry to the switch.

At least one flow entry may form a flow table, and each flow entry is a forwarding rule. The controller creates a corresponding flow entry for the multicast group member, so that when receiving a first query response sent by the multicast group member, the switch queries for the flow entry corresponding to the multicast group member, to determine a forwarding rule of the first query response.

In this embodiment of the present disclosure, the switch may maintain one flow table, or two flow tables. When the switch maintains two flow tables, the two flow tables are a first flow table and a second flow table. The first flow table includes at least one first flow entry, and the first flow entry includes at least a multicast group address, a port number, and a to-be-performed operation, where the port number is a number of a port using which the multicast group member is connected to the switch, and the to-be-performed operation is an operation needing to be performed on the first query response sent by the multicast group member. The second flow table includes at least one second flow entry, and the second flow entry includes at least a multicast group address, a query response count value, and a to-be-performed operation. The flow entry that is created by the controller for the multicast group member according to the multicast group address and the port number that are carried by the second multicast join message is the first flow entry.

In this embodiment of the present disclosure, the multicast group address may be an Internet Protocol (IP) address, or may be a Media Access Control (MAC) address. In this embodiment of the present disclosure, a description is provided using an example in which the multicast group address is an IP address.

For example, the multicast group address carried by the second multicast join message is 225.1.1.1, and the port number is 5. In this case, the flow entry created by the controller for the multicast group member according to the multicast group address 225.1.1.1 and the port number 5 may be the first flow entry shown in Table 1 below. The first flow entry not only includes the multicast group address 225.1.1.1 and the port number 5, but also includes a to-be-performed operation. The to-be-performed operation is turning to the second flow table.

TABLE 1

| Multicast group address | Port number | To-be-performed operation |
| --- | --- | --- |
| 225.1.1.1 | 5 | Turn to a second flow table |

It should be noted that in this embodiment of the present disclosure, a description is provided using only an example in which the first flow entry includes the multicast group address, the port number, and the to-be-performed operation. In an actual application, the first flow entry may further include other information.

Step 404: The switch receives the flow entry, and stores the flow entry in a corresponding flow table.

Because the flow entry created by the controller for the multicast group member is the first flow entry, the flow entry received by the switch is the first flow entry, and when the switch receives the first flow entry, the switch stores the flow entry in the first flow table.

For example, a first flow table is shown in Table 2 below, where the flow table includes multiple first flow entries, and the received first flow entry corresponding to the multicast group member may be stored in the first flow table shown in Table 2 below.

TABLE 2

| Multicast group address | Port number | To-be-performed operation |
| --- | --- | --- |
| 225.1.1.1 | 3 | Turn to a second flow table |
| 225.1.0.6 | 5 | Turn to a second flow table |
| 225.1.1.1 | 5 | Turn to a second flow table |

The multicast group member joins the multicast group according to steps 401 to 404. The controller creates a corresponding flow entry for the multicast group member. After the controller stores the flow entry in the switch, the switch may maintain the flow entry corresponding to the multicast group member, and perform, according to the flow entry corresponding to the multicast group member, a corresponding operation on the first query response sent by the multicast group member. Maintaining, by the controller, the multicast group member included in the multicast group may be implemented according to steps 405 to 412 below.

Step 405: The controller sends a query message to the switch at intervals of a preset period.

The controller maintains, at intervals of the preset period, the multicast group member included in the multicast group, and the controller maintains, according to the first query response sent by the multicast group member included in the multicast group, the multicast group member included in the multicast group. Therefore, the controller needs to send the query message to the switch at intervals of the preset period.

Further, because the controller may be connected to at least one switch, and each switch may further be connected to at least one multicast group member, to send the query message to each multicast group member connected to the switch, the controller may add a destination address to the query message, where the destination address is a reserved address.

The reserved address is a special address, and the reserved address is not allocated by a network side. Therefore, when receiving the query message carrying the reserved address, the switch may be instructed to send the query message to a multicast group member connected to each port included by the switch.

The query message may be sent in a form of a query data packet, or may be sent in another form, which is not limited in the present disclosure.

Step 406: The switch receives the query message, and sends the query message to each multicast group member included in a multicast group.

When receiving the query message, the switch determines that the destination address carried by the query message is the reserved address. Regardless of whether any multicast group member is connected to the port of the switch, the query message is sent to each port of the switch, so that the switch delivers the query message.

When the query message is sent in a form of a query data packet, to enable the multicast group member to identify the query data packet, the switch further needs to encapsulate the query data packet according to the OpenFlow network protocol, and sends an encapsulated query data packet to the multicast group member.

Step 407: When receiving the query message, the multicast group member included in the multicast group sends a first query response to the switch, where the first query response carries a multicast group address.

When the multicast group member included in the multicast group receives the query message, the multicast group member included in the multicast group generates a corresponding first query response according to the query message, and sends the first query response to the switch, where the first query response carries the multicast group address.

The multicast group includes at least one multicast group member. Therefore, the switch may also receive at least one first query response.

Step 408: If a stored flow table includes the multicast group address and a flow entry corresponding to a port number that corresponds to the multicast group member, discard the first query response, and increase a corresponding query response count value.

When the switch receives the query response, the switch acquires a port number corresponding to the multicast group member, and compares the multicast group member and the acquired port number that are carried by the first query response with a multicast group address and a port number that are in each first flow entry included in the stored first flow table; if the stored first flow table includes a first flow entry that corresponds to the multicast group address and the port number, the switch acquires, from the first flow table, a to-be-performed operation corresponding to both the multicast group address and the port number, and turns to query the second flow table according to the to-be-performed operation. If a corresponding to-be-performed operation found from the second flow table according to the multicast group address is a discarding operation, the first query response is discarded. A corresponding query response count value is found, according to the multicast group address, from the second flow entry included in the second flow table, and the found query response count value is increased.

Each multicast group member is separately connected to a port of the switch. Therefore, when the switch receives the first query response, the switch may acquire a number of a port using which the multicast group member is connected to the switch, and determine the acquired port number as a port number corresponding to the multicast group member.

In this embodiment of the present disclosure, when the stored first flow table includes the first flow entry corresponding to the multicast group address and the port number, the first query response may be directly discarded, or the first query response may be temporarily stored, for subsequent use. That is, the to-be-performed operation corresponding to the multicast group address in the second flow table may be a temporary storage operation.

A specific operation of increasing the found query response count value may be increasing the found query response count value by 1.

It should be noted that, when the stored first flow table includes the first flow entry corresponding to the multicast group address and the port number, it is determined that the multicast group member already joins the multicast group. To reduce load of the controller, the first query response is not sent to the controller, but the query response count value corresponding to the multicast group address in the switch is increased.

It should be noted that in this embodiment of the present disclosure, a description is provided using only an example in which the second flow entry includes the multicast group address, the query response count value, and the to-be-performed operation. In an actual application, the second flow entry may further include other information.

For example, the multicast group address is 225.1.1.1, the port number is 5, the switch compares the multicast group address 225.1.1.1 and the port number 5 with the multicast group address and the port number that are included in each first flow entry in Table 2 above, determines that the multicast group address 225.1.1.1 and the port number 5 exist in the first flow table shown in Table 2 above, and acquires that a to-be-performed operation corresponding to both the multicast group address 225.1.1.1 and the port number 5 is turning to the second flow table. A corresponding to-be-performed operation acquired, according to the multicast group address 225.1.1.1, from the second flow table shown in Table 3 below is a discarding operation. In this case, the first query response is discarded.

TABLE 3

| Multicast group address | Query response count value | To-be-performed operation |
| --- | --- | --- |
| 225.1.0.6 | 5 | Discard |
| 225.1.1.1 | 5 | Discard |
| 225.1.1.2 | 4 | Discard |

Further, after the first query response is discarded, a corresponding query response count value 5 is found from Table 2 above according to the multicast group address 225.1.1.1, and the found query response count value 5 is increased by 1, to obtain a query response count value 6. In this case, Table 3 above becomes Table 4 below.

TABLE 4

| Multicast group address | Query response count value | To-be-performed operation |
| --- | --- | --- |
| 225.1.0.6 | 5 | Discard |
| 225.1.1.1 | 6 | Discard |
| 225.1.1.2 | 4 | Discard |

Because the switch may receive at least one first query response, for each first query response, the switch may perform the method in step 408.

Step 409: When the controller acquires a count value of current period query responses received by the switch in a current period, the controller sends a flow entry query message to the switch, where the flow entry query message carries a target flow table identifier and a target flow entry identifier.

After the controller sends the query message to the multicast group member using the switch, it takes a period of time for each multicast group member to receive the query message and send the first query response corresponding to the query message to the switch, and it also takes a period of time for the switch to process the first query response. Therefore, after sending the query message to the switch, the controller starts timing. When timing duration reaches a preset period of time, the controller sends the flow entry query message to the switch, to maintain the multicast group member included in the multicast group.

The preset period of time is set by the controller in advance, and in the preset period of time, the multicast group member included in the multicast group may complete sending the first query response to the switch, and the switch may also complete processing the first query response.

The target flow table identifier is used to uniquely identify the flow table, and the target flow table identifier may be a name of the flow table, may be a sequence number that is set by the controller for the flow table, or the like. The target flow entry identifier is used to uniquely identify the flow entry, and the target flow entry identifier may be a sequence number of the flow entry, may be a position of the flow entry in the flow table, may be a multicast group address included in the flow entry, or the like. A unique corresponding flow entry can be found from the flow table according to the target flow table identifier and the target flow entry identifier.

Step 410: The switch receives the flow entry query message, and acquires a corresponding query response count value from the stored flow table according to the target flow table identifier and the target flow entry identifier.

In this embodiment of the present disclosure, the flow entry query message has a particular format, and the controller may generate the flow entry query message according to the format of the flow entry query message.

For example, the target flow table identifier indicates that a flow table that needs to be queried is the second flow table, and the target flow entry identifier is the multicast group address 225.1.1.1 included in the flow entry; the switch receives the flow entry query message, and acquires the corresponding query response count value 6 from the flow table shown in Table 4 above according to the multicast group address 225.1.1.1.

Step 411: The switch uses the acquired query response count value as the count value of current period query responses, and sends the count value of current period query responses to the controller.

Because the flow entry query message is sent the preset period of time after the switch sends the query message, when the switch receives the flow entry query message, the acquired query response count value is a result obtained after the first query response sent by each multicast group member included in the multicast group is processed. In this case, the acquired query response count value may be used as the count value of current period query responses and sent to the controller.

Step 412: The controller receives the count value of current period query responses, and maintains, according to the count value of current period query responses and a count value of previous period query responses, the multicast group member included in the multicast group.

This step may be implemented using the following steps (1) to (4), which include:

(1) The controller receives the count value of current period query responses.

(2) Acquire a preset query response count value increment corresponding to the multicast group.

The controller acquires the corresponding preset query response count value increment from a stored correspondence between a multicast group address and a preset query response count value increment according to the multicast group address, and determines the acquired preset query response count value increment as the preset query response count value increment corresponding to the multicast group.

The preset query response count value increment is an actual quantity of multicast group members included in the multicast group in a previous period. When the multicast group members included in the multicast group change in the previous period, the preset query response count value increment also changes.

Further, when the controller maintains the multicast group member included in the multicast group for the first time, the controller may set the preset query response count value increment to 0.

(3) Calculate a difference between the count value of current period query responses and the count value of previous period query responses.

The count value of previous period query responses is subtracted from the count value of current period query responses, to obtain the difference.

Each time a first query response sent by a multicast group member included in the multicast group is received, the switch increases a query response count value corresponding to the multicast group. Therefore, the query response count value is increased as a quantity of periods increases, that is, the count value of current period query responses is greater than or equal to the count value of previous period query responses. Therefore, the difference between the count value of current period query responses and the count value of previous period query responses needs to be calculated, the preset query response count value increment corresponding to the multicast group needs to be acquired, and whether the multicast group member included in the multicast group changes is determined according to the difference and the preset query response count value increment.

(4) Maintain the multicast group member included in the multicast group according to the difference and the preset query response count value increment.

The difference is compared with the preset query response count value increment, and if the difference is less than the preset query response count value increment, it is determined that there exists a multicast group member abnormally leaving the multicast group; a port number corresponding to the multicast group member that abnormally leaves is acquired, and the acquired port number is deleted from a multicast path.

Preferably, after the port number corresponding to the multicast group member that abnormally leaves is acquired, the controller may further send the query message to the multicast group member according to the acquired port number using the switch. If the multicast group member has not returned the first query response, it is determined that the multicast group member is a multicast group member that abnormally leaves, and the acquired port number is deleted from the multicast path, to stop forwarding a multicast data stream to the multicast group member.

A specific operation of acquiring a port number corresponding to the multicast group member that abnormally leaves may be sending, by the controller, a deletion message to the switch, where the deletion message carries a multicast group address, so that the switch deletes the flow entry corresponding to the multicast group address; after the switch deletes the flow entry corresponding to the multicast group address, sending, by the controller, the query message to the switch, where the query message carries a multicast group address of the multicast group, so that the switch sends the query message to each multicast group member included in the multicast group; when receiving the query message, sending, by the multicast group member included in the multicast group, a first query response to the switch; receiving, by the switch, at least one first query response, separately encapsulating the received at least one first query response, to obtain at least one second query response, and reporting the at least one second query response to the controller; receiving, by the controller, the at least one second query response reported by the switch, where the at least one second query response each carries the multicast group address and a port number; and acquiring, by the controller, a corresponding port number from a stored correspondence between a multicast group address and a port number according to the multicast group address; and comparing the acquired port number with the port number carried by the at least one second query response, to determine the port number corresponding to the multicast group member that abnormally leaves.

The corresponding port number that is acquired by the controller from the stored correspondence between a multicast group address and a port number according to the multicast group address is at least one port number. In this case, a specific operation of comparing, by the controller, the acquired port number with the port number carried by the at least one second query response, to determine the port number corresponding to the multicast group member that abnormally leaves may be comparing the acquired port number with the port number carried by the at least one second query response, and selecting, from the acquired port number, a port number except the port number carried by the at least one second query response; and determining the selected port number as the port number corresponding to the multicast group member that abnormally leaves.

The controller deletes the acquired port number from the multicast path, and stops sending multicast data to the port when multicast data is sent subsequently, that is, stops sending multicast data to the multicast group member that abnormally leaves.

Further, if the difference is equal to the preset query response count value increment, it is determined that the multicast group member included in the multicast group does not change, no processing is performed, and the operations are ended.

Further, in this embodiment of the present disclosure, not only a multicast group member that abnormally leaves the multicast group but also a multicast group member that normally leaves the multicast group may exist. When a multicast group member normally leaves the multicast group, a specific operation process may be sending, by the multicast group member, a first multicast leave message to the switch, where the first multicast leave message carries a multicast group address; receiving, by the switch, the first multicast leave message, and encapsulating the first multicast leave message, to obtain a second multicast leave message, where the second multicast leave message carries the multicast group address and a port number; deleting, by the switch, a corresponding flow entry from a flow table according to the multicast group address and the port number; and reporting, by the switch, the second multicast leave message to the controller, so that the controller deletes the port number from the multicast path.

In this embodiment of the present disclosure, when a multicast group member joins the multicast group, a controller creates a corresponding flow entry for the multicast group member, and a switch maintains the flow entry. When the controller maintains the multicast group member included in the multicast group, the controller sends a query message to the switch, so that the switch sends the query message to each multicast group member included in the multicast group. When receiving a first query response sent by the multicast group member, the switch queries, according to a multicast group address carried by the first query response and a port number that corresponds to the multicast group member, for a corresponding flow entry in a flow table maintained by the switch. If the corresponding flow entry is found, the switch discards the first query response, omitting sending the query response to the controller. The controller does not need to periodically process a relatively large quantity of query responses, which reduces load of the controller. After a preset period of time, the controller may acquire, from the switch, a count value, corresponding to the multicast group address, of current period query responses in a current period, and determines, according to the count value of current period query responses and a count value of previous period query responses, whether the multicast group member included in the multicast group changes. In this way, when the multicast group member does not change, determining may be quickly performed by directly using the count value of current period query responses and the count value of previous period query responses, thereby improving efficiency of maintaining the multicast group member. When the multicast group member changes, determining is then performed according to the first query response sent by the multicast group member; and the controller needs to process only query responses in the current period, which also reduces load of the controller.

Figure 5:
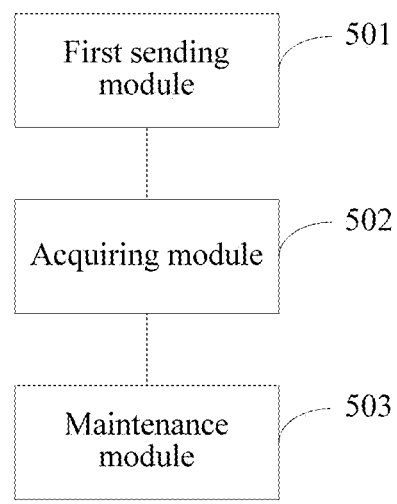
FIG. 5 is a schematic structural diagram of a device for maintaining a multicast group member according to an embodiment of the present disclosure.

FIG. 5 is a schematic structural diagram of a device for maintaining a multicast group member according to an embodiment of the present disclosure. Referring to FIG. 5, the device includes a first sending module 501 configured to send a query message to a switch at intervals of a preset period, so that the switch sends the query message to each multicast group member included in a multicast group; an acquiring module 502 configured to acquire a count value of current period query responses received by the switch in a current period; and a maintenance module 503 configured to maintain, according to the count value of current period query responses and a count value of previous period query responses, the multicast group member included in the multicast group.

Optionally, the acquiring module 502 includes a first sending unit configured to send a flow entry query message to the switch, where the flow entry query message carries a target flow table identifier and a target flow entry identifier, so that the switch queries for a query response count value corresponding to both the target flow table identifier and the target flow entry identifier; and a first receiving unit configured to receive the query response count value sent by the switch, and determine the received query response count value as the count value of current period query responses.

Optionally, the maintenance module 503 includes a first acquiring unit configured to acquire a preset query response count value increment corresponding to the multicast group; a calculation unit configured to calculate a difference between the count value of current period query responses and the count value of previous period query responses; and a maintenance unit configured to maintain, according to the difference and the preset query response count value increment, the multicast group member included in the multicast group.

Optionally, the maintenance unit includes a determining subunit configured to, if the difference is less than the preset query response count value increment, determine that there exists a multicast group member abnormally leaving the multicast group; and a deletion subunit configured to acquire a port number corresponding to the multicast group member that abnormally leaves, and delete the acquired port number from a multicast path.

Optionally, the deletion subunit is configured to send a deletion message to the switch, where the deletion message carries a multicast group address, so that the switch deletes a flow entry corresponding to the multicast group address; send the query message to the switch, where the query message carries a multicast group address of the multicast group, so that the switch sends the query message to each multicast group member included in the multicast group; receive at least one second query response reported by the switch, where the at least one second query response is obtained by separately encapsulating at least one first query response, the at least one first query response is sent according to the query message by the multicast group member included in the multicast group, and the at least one second query response each carries a multicast group address and a port number; acquire a corresponding port number from a stored correspondence between a multicast group address and a port number according to the multicast group address; and compare the acquired port number with the port number carried by the at least one second query response, to determine the port number corresponding to the multicast group member that abnormally leaves.

Further, the device further includes a first receiving module configured to receive a first multicast join message sent by the multicast group member, where the first multicast join message carries a multicast group address; a creation module configured to create a flow entry for the multicast group member according to the multicast group address and a port number that corresponds to the multicast group member; and a second sending module configured to send the flow entry to the switch, so that the switch stores the flow entry in a corresponding flow table.

In this embodiment of the present disclosure, when a controller maintains a multicast group member included in the multicast group, the controller sends a query message to a switch, so that the switch sends the query message to each multicast group member included in the multicast group. When receiving a first query response sent by the multicast group member, the switch queries, according to a multicast group address carried by the first query response and a port number that corresponds to the multicast group member, for a corresponding flow entry in a flow table maintained by the switch. If the corresponding flow entry is found, the switch discards the first query response, omitting sending the query response to the controller. The controller does not need to periodically process a relatively large quantity of query responses, which reduces load of the controller. The controller acquires, from the switch, a count value, corresponding to the multicast group address, of current period query responses in a current period, and determines, according to the count value of current period query responses and a count value of previous period query responses, whether the multicast group member included in the multicast group changes. In this way, when the multicast group member does not change, determining may be quickly performed by directly using the count value of current period query responses and the count value of previous period query responses, thereby improving efficiency of maintaining the multicast group member. When the multicast group member changes, determining is then performed according to the first query response sent by the multicast group member; and the controller needs to process only query responses in the current period, which also reduces load of the controller.

Figure 6:
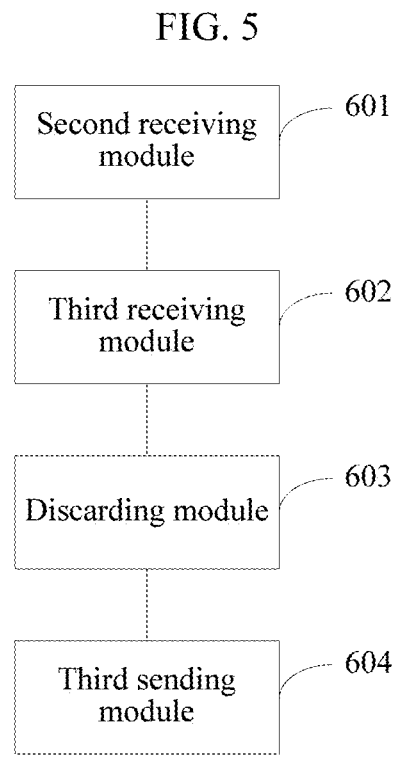
FIG. 6 is a schematic structural diagram of another device for maintaining a multicast group member according to an embodiment of the present disclosure.

FIG. 6 is a schematic structural diagram of a device for maintaining a multicast group member according to an embodiment of the present disclosure. Referring to FIG. 6, the apparatus includes a second receiving module 601 configured to receive, at intervals of a preset period, a query message sent by a controller, and send the query message to each multicast group member included in a multicast group; a third receiving module 602 configured to receive a first query response sent by the multicast group member, where the first query response carries a multicast group address; a discarding module 603 configured to, if a stored flow table includes the multicast group address and a flow entry in which a port number corresponding to the multicast group member is located, discard the first query response, and acquire a count value of current period query responses according to a quantity of the first query responses; and a third sending module 604 configured to send the count value of current period query responses to the controller, so that the controller maintains, according to the count value of current period query responses and a count value of previous period query responses, the multicast group member included in the multicast group.

Optionally, the third sending module 604 includes a second receiving unit configured to receive a flow entry query message sent by the controller, where the flow entry query message carries a target flow table identifier and a target flow entry identifier; a second acquiring unit configured to acquire a corresponding query response count value from the stored flow table according to the target flow table identifier and the target flow entry identifier; and a second sending unit configured to use the acquired query response count value as the count value of current period query responses and send the count value of current period query responses to the controller.

Optionally, the device further includes a first deletion module configured to, when the controller determines that there exists a multicast group member abnormally leaving the multicast group, receive a deletion message sent by the controller, where the deletion message carries a multicast group address, and delete a corresponding flow entry from the flow table according to the multicast group address; a fourth sending module configured to, when the query message sent by the controller is received, send the query message to each multicast group member included in the multicast group, where the query message carries a multicast group address of the multicast group; a fourth receiving module configured to receive at least one first query response sent by the multicast group member included in the multicast group, where the at least one first query response each carries a multicast group address; a first encapsulation module configured to separately encapsulate the at least one first query response, to obtain at least one second query response, where the at least one second query response each carries the multicast group address and a port number that corresponds to the multicast group member; and a fifth sending module configured to send the at least one second query response to the controller, so that the controller acquires a port number corresponding the multicast group member that abnormally leaves, and delete the acquired port number from a multicast path.

Optionally, the device further includes a first receiving module configured to receive a first multicast join message sent by the multicast group member, where the first multicast join message carries a multicast group address; a second encapsulation module configured to encapsulate the first multicast join message, to obtain a second multicast join message, where the second multicast join message carries the multicast group address and a port number; a sixth sending module configured to send the second multicast join message to the controller, so that the controller creates a flow entry for the multicast group member according to the second multicast join message; and a storage module configured to receive the flow entry sent by the controller, and store the flow entry in the flow table.

Further, the device further includes a sixth receiving module configured to receive a first multicast leave message sent by a multicast group member, where the first multicast leave message carries a multicast group address; a second deletion module configured to delete a corresponding flow entry from the flow table according to the multicast group address and a port number that corresponds to the multicast group member; a third encapsulating module configured to encapsulate the first multicast leave message, to obtain a second multicast leave message, where the second multicast leave message carries the multicast group address and the port number; and a seventh sending module configured to send the second multicast leave message to the controller, so that the controller deletes the port number from the multicast path.

In this embodiment of the present disclosure, when a controller maintains a multicast group member included in the multicast group, the controller sends a query message to a switch, so that the switch sends the query message to each multicast group member included in the multicast group. When receiving a first query response sent by the multicast group member, the switch queries, according to a multicast group address carried by the first query response and a port number that corresponds to the multicast group member, for a corresponding flow entry in a flow table maintained by the switch. If the corresponding flow entry is found, the switch discards the first query response, omitting sending the query response to the controller. The controller does not need to periodically process a relatively large quantity of query responses, which reduces load of the controller. The controller acquires, from the switch, a count value, corresponding to the multicast group address, of current period query responses in a current period, and determines, according to the count value of current period query responses and a count value of previous period query responses, whether the multicast group member included in the multicast group changes. In this way, when the multicast group member does not change, determining may be quickly performed by directly using the count value of current period query responses and the count value of previous period query responses, thereby improving efficiency of maintaining the multicast group member. When the multicast group member changes, determining is then performed according to the first query response sent by the multicast group member; and the controller needs to process only query responses in the current period, which also reduces load of the controller.

Figure 7:
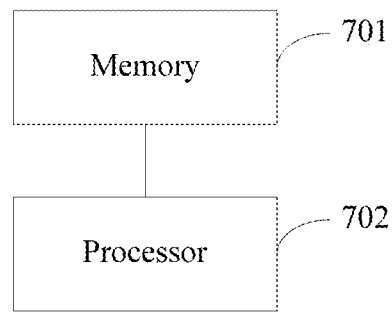
FIG. 7 is a schematic structural diagram of another device for maintaining a multicast group member according to an embodiment of the present disclosure.
Figure 8:
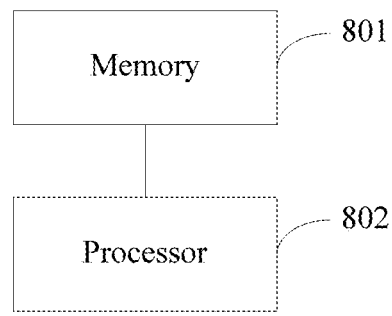
FIG. 8 is a schematic structural diagram of another device for maintaining a multicast group member according to an embodiment of the present disclosure.

FIG. 7 is a schematic structural diagram of a device for maintaining a multicast group member according to an embodiment of the present disclosure. Referring to FIG. 8, the device includes a memory 701 and a processor 702 configured to perform the following method for maintaining a multicast group member, where the method includes sending a query message to a switch at intervals of a preset period, so that the switch sends the query message to each multicast group member included in a multicast group; acquiring a count value of current period query responses received by the switch in a current period; and maintaining, according to the count value of current period query responses and a count value of previous period query responses, the multicast group member included in the multicast group.

Optionally, the acquiring a count value of current period query responses received by the switch in a current period includes sending a flow entry query message to the switch, where the flow entry query message carries a target flow table identifier and a target flow entry identifier, so that the switch queries for a query response count value corresponding to both the target flow table identifier and the target flow entry identifier; and receiving the query response count value sent by the switch, and determining the received query response count value as the count value of current period query responses.

Optionally, the maintaining, according to the count value of current period query responses and a count value of previous period query responses, the multicast group member included in the multicast group includes acquiring a preset query response count value increment corresponding to the multicast group; calculating a difference between the count value of current period query responses and the count value of previous period query responses; and maintaining, according to the difference and the preset query response count value increment, the multicast group member included in the multicast group.

Optionally, the maintaining, according to the difference and the preset query response count value increment, the multicast group member included in the multicast group includes, if the difference is less than the preset query response count value increment, determining that there exists a multicast group member abnormally leaving the multicast group; and acquiring a port number corresponding to the multicast group member that abnormally leaves, and deleting the acquired port number from a multicast path.

Optionally, the acquiring a port number corresponding to the multicast group member that abnormally leaves includes sending a deletion message to the switch, where the deletion message carries a multicast group address, so that the switch deletes a flow entry corresponding to the multicast group address; sending the query message to the switch, where the query message carries a multicast group address of the multicast group, so that the switch sends the query message to each multicast group member included in the multicast group; receiving at least one second query response reported by the switch, where the at least one second query response is obtained by separately encapsulating at least one first query response, the at least one first query response is sent according to the query message by the multicast group member included in the multicast group, and the at least one second query response each carries a multicast group address and a port number; acquiring a corresponding port number from a stored correspondence between a multicast group address and a port number according to the multicast group address; and comparing the acquired port number with the port number carried by the at least one second query response, to determine the port number corresponding to the multicast group member that abnormally leaves.

Further, the method further includes receiving a first multicast join message sent by the multicast group member, where the first multicast join message carries a multicast group address; creating a flow entry for the multicast group member according to the multicast group address and a port number that corresponds to the multicast group member; and sending the flow entry to the switch, so that the switch stores the flow entry in a corresponding flow table.

In this embodiment of the present disclosure, when a controller maintains a multicast group member included in the multicast group, the controller sends a query message to a switch, so that the switch sends the query message to each multicast group member included in the multicast group. When receiving a first query response sent by the multicast group member, the switch queries, according to a multicast group address carried by the first query response and a port number that corresponds to the multicast group member, for a corresponding flow entry in a flow table maintained by the switch. If the corresponding flow entry is found, the switch discards the first query response, omitting sending the query response to the controller. The controller does not need to periodically process a relatively large quantity of query responses, which reduces load of the controller. The controller acquires, from the switch, a count value, corresponding to the multicast group address, of current period query responses in a current period, and determines, according to the count value of current period query responses and a count value of previous period query responses, whether the multicast group member included in the multicast group changes. In this way, when the multicast group member does not change, determining may be quickly performed by directly using the count value of current period query responses and the count value of previous period query responses, thereby improving efficiency of maintaining the multicast group member. When the multicast group member changes, determining is then performed according to the first query response sent by the multicast group member, and the controller needs to process only query responses in the current period, which also reduces load of the controller.

FIG. 8 is a schematic structural diagram of a device for maintaining a multicast group member according to an embodiment of the present disclosure. Referring to FIG. 8, the device includes a memory 801 and a processor 802 configured to perform the following method for maintaining a multicast group member, where the method includes receiving, at intervals of a preset period, a query message sent by a controller, and sending the query message to each multicast group member included in a multicast group; receiving a first query response sent by the multicast group member, where the first query response carries a multicast group address; if a stored flow table includes the multicast group address and a flow entry in which a port number corresponding to the multicast group member is located, discarding the first query response, and acquiring a count value of current period query responses according to a quantity of the first query responses; and sending the count value of current period query responses to the controller, so that the controller maintains, according to the count value of current period query responses and a count value of previous period query responses, the multicast group member included in the multicast group.

Optionally, the sending the count value of current period query responses to the controller includes receiving a flow entry query message sent by the controller, where the flow entry query message carries a target flow table identifier and a target flow entry identifier; acquiring a corresponding query response count value from the stored flow table according to the target flow table identifier and the target flow entry identifier; and using the acquired query response count value as the count value of current period query responses and sending the count value of current period query responses to the controller.

Optionally, after the sending the count value of current period query responses to the controller, the method further includes, when the controller determines that there exists a multicast group member abnormally leaving the multicast group, receiving a deletion message sent by the controller, where the deletion message carries a multicast group address, and deleting a corresponding flow entry from the flow table according to the multicast group address; when the query message sent by the controller is received, sending the query message to each multicast group member included in the multicast group, where the query message carries a multicast group address of the multicast group; receiving at least one first query response sent by the multicast group member included in the multicast group, where the at least one first query response each carries a multicast group address; separately encapsulating the at least one first query response, to obtain at least one second query response, where the at least one second query response each carries the multicast group address and a port number that corresponds to the multicast group member; and sending the at least one second query response to the controller, so that the controller acquires a port number corresponding the multicast group member that abnormally leaves, and deleting the acquired port number from a multicast path.

Optionally, before the receiving a first query response sent by the multicast group member, the method further includes receiving a first multicast join message sent by the multicast group member, where the first multicast join message carries a multicast group address; encapsulating the first multicast join message, to obtain a second multicast join message, where the second multicast join message carries the multicast group address and a port number; sending the second multicast join message to the controller, so that the controller creates a flow entry for the multicast group member according to the second multicast join message; and receiving the flow entry sent by the controller, and storing the flow entry in the flow table.

Further, the method further includes receiving a first multicast leave message sent by a multicast group member, where the first multicast leave message carries a multicast group address; deleting a corresponding flow entry from the flow table according to the multicast group address and a port number that corresponds to the multicast group member; encapsulating the first multicast leave message, to obtain a second multicast leave message, where the second multicast leave message carries the multicast group address and the port number; and sending the second multicast leave message to the controller, so that the controller deletes the port number from the multicast path.

In this embodiment of the present disclosure, when a controller maintains a multicast group member included in the multicast group, the controller sends a query message to a switch, so that the switch sends the query message to each multicast group member included in the multicast group. When receiving a first query response sent by the multicast group member, the switch queries, according to a multicast group address carried by the first query response and a port number that corresponds to the multicast group member, for a corresponding flow entry in a flow table maintained by the switch. If the corresponding flow entry is found, the switch discards the first query response, omitting sending the query response to the controller. The controller does not need to periodically process a relatively large quantity of query responses, which reduces load of the controller. The controller acquires, from the switch, a count value, corresponding to the multicast group address, of current period query responses in a current period, and determines, according to the count value of current period query responses and a count value of previous period query responses, whether the multicast group member included in the multicast group changes. In this way, when the multicast group member does not change, determining may be quickly performed by directly using the count value of current period query responses and the count value of previous period query responses, thereby improving efficiency of maintaining the multicast group member. When the multicast group member changes, determining is then performed according to the first query response sent by the multicast group member, and the controller needs to process only query responses in the current period, which also reduces load of the controller.

It should be noted that, when the device, which is provided in the foregoing embodiments, for maintaining a multicast group member maintains a multicast group member, division of the foregoing function modules is merely used as an example for description. In an actual application, the foregoing functions can be allocated to different function modules and completed according to a requirement, that is, an inner structure of the device is divided into different function modules to complete all or some of the functions described above. In addition, the device, which is provided in the foregoing embodiments, for maintaining a multicast group member and embodiments of the method for maintaining a multicast group member belong to a same concept. For a specific implementation process, refer to the method embodiments, and details are not described herein again.

The sequence numbers of the foregoing embodiments of the present disclosure are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, or an optical disc.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A method for maintaining a multicast group member, comprising:
   sending a query message to a switch at intervals of a preset period, such that the switch sends the query message to each multicast group member of a multicast group;
   acquiring a count value of current period query responses received by the switch in a current period;
   acquiring a count value of previous period query responses corresponding to the multicast group;
   determining that a multicast group member is abnormally leaving the multicast group when the count value of previous period query responses is greater than the count value of current period query responses;
   sending a deletion message to the switch, wherein the deletion message carries a multicast group address, wherein the switch deletes a flow entry corresponding to the multicast group address;
   sending the query message to the switch, wherein the query message carries a multicast group address of the multicast group, wherein the switch sends the query message to each multicast group member comprised in the multicast group;
   receiving at least one second query response reported by the switch, wherein the at least one second query response is obtained by separately encapsulating at least one first query response, wherein the at least one first query response is sent according to the query message by the multicast group member comprised in the multicast group, and wherein the at least one second query response each carries a multicast group address and a port number;
   acquiring a corresponding port number from a stored correspondence between a multicast group address and a port number according to the multicast group address;
   comparing the acquired port number with the port number carried by the at least one second query response in order to determine a port number corresponding to the multicast group member that abnormally leaves; and
   deleting the acquired port number from a multicast path.

2. The method according to claim 1, wherein acquiring the count value of current period query responses received by the switch in the current period comprises:
   sending a flow entry query message to the switch, wherein the flow entry query message carries a target flow table identifier and a target flow entry identifier, such that the switch queries for a query response count value corresponding to both the target flow table identifier and the target flow entry identifier;
   receiving the query response count value sent by the switch; and
   setting the received query response count value as the count value of current period query responses.

3. The method according to claim 1, further comprising:
   receiving a first multicast join message sent by the multicast group member, wherein the first multicast join message carries a multicast group address;
   creating a flow entry for the multicast group member according to the multicast group address and a port number that corresponds to the multicast group member; and
   sending the flow entry to the switch, wherein the switch stores the flow entry in a corresponding flow table.

4. A method for maintaining a multicast group member, comprising:
   receiving, at intervals of a preset period, a query message sent by a controller;
   sending the query message to each multicast group member of a multicast group;
   receiving a first query response sent by the multicast group member, wherein the first query response carries a multicast group address;
   discarding the first query response, and acquiring a count value of current period query responses according to a quantity of the first query responses when a stored flow table comprises the multicast group address and a flow entry in which a port number corresponding to the multicast group member is located;
   sending the count value of current period query responses to the controller, wherein the controller maintains, according to a difference between the count value of current period query responses and a count value of previous period query responses, the multicast group member comprised in the multicast group;
   receiving a first multicast leave message sent by a multicast group member, wherein the first multicast leave message carries a multicast group address;
   deleting a corresponding flow entry from the stored flow table according to the multicast group address and a port number that corresponds to the multicast group member;
   encapsulating the first multicast leave message in order to obtain a second multicast leave message, wherein the second multicast leave message carries the multicast group address and the port number; and sending the second multicast leave message to the controller, such that the controller deletes the port number from a multicast path.

5. The method according to claim 4, wherein sending the count value of current period query responses to the controller comprises:

receiving a flow entry query message sent by the controller, wherein the flow entry query message carries a target flow table identifier and a target flow entry identifier;

acquiring a corresponding query response count value from the stored flow table according to the target flow table identifier and the target flow entry identifier;

setting the acquired query response count value as the count value of current period query responses; and sending the count value of current period query responses to the controller.

6. The method according to claim 4, wherein before receiving the first query response sent by the multicast group member, the method further comprises:

receiving a first multicast join message sent by the multicast group member, wherein the first multicast join message carries a multicast group address;

encapsulating the first multicast join message in order to obtain a second multicast join message, wherein the second multicast join message carries the multicast group address and a port number;

sending the second multicast join message to the controller, wherein the controller creates a flow entry for the multicast group member according to the second multicast join message;

receiving the flow entry sent by the controller; and storing the flow entry in the stored flow table.

7. An apparatus for maintaining a multicast group member, comprising:

a memory having a plurality of instructions stored thereon; and a processor coupled to the memory and configured to:

send a query message to a switch at intervals of a preset period, such that the switch sends the query message to each multicast group member comprised in a multicast group;

acquire a count value of current period query responses received by the switch in a current period and a count value of previous period query responses;

determine that there exists a multicast group member abnormally leaving the multicast group when the count value of previous period query responses is greater than the count value of current period query responses; and send a deletion message to the switch, wherein the deletion message carries a multicast group address, wherein the switch deletes a flow entry corresponding to the multicast group address;

send the query message to the switch, wherein the query message carries a multicast group address of the multicast group, wherein the switch sends the query message to each multicast group member comprised in the multicast group;

receive at least one second query response reported by the switch, wherein the at least one second query response is obtained by separately encapsulating at least one first query response, wherein the at least one first query response is sent according to the query message by the multicast group member comprised in the multicast group, and wherein the at least one second query response each carries a multicast group address and a port number;

acquire a corresponding port number from a stored correspondence between a multicast group address and a port number according to the multicast group address;

compare the acquired port number with the port number carried by the at least one second query response in order to determine a port number corresponding to the multicast group member that abnormally leaves; and delete the acquired port number from a multicast path.

8. The apparatus according to claim 7, wherein the instructions further cause the processor to:

send a flow entry query message to the switch, wherein the flow entry query message carries a target flow table identifier and a target flow entry identifier, such that the switch queries for a query response count value corresponding to both the target flow table identifier and the target flow entry identifier;

receive the query response count value sent by the switch; and set the received query response count value as the count value of current period query responses.

9. The apparatus according to claim 7, wherein the instructions further cause the processor to:

receive a first multicast join message sent by the multicast group member, wherein the first multicast join message carries a multicast group address;

create a flow entry for the multicast group member according to the multicast group address and a port number that corresponds to the multicast group member; and send the flow entry to the switch, wherein the switch stores the flow entry in a corresponding flow table.

10. An apparatus for maintaining a multicast group member, comprising:

a memory having a plurality of instructions stored thereon; and a processor coupled to the memory and configured to:

receive, at intervals of a preset period, a query message sent by a controller, send the query message to each multicast group member comprised in a multicast group;

receive a first query response sent by the multicast group member, wherein the first query response carries a multicast group address;

when a stored flow table comprises the multicast group address and a flow entry in which a port number corresponding to the multicast group member is located, discard the first query response, and acquire a count value of current period query responses according to a quantity of the first query responses;

send the count value of current period query responses to the controller, wherein the controller maintains, according to a difference between the count value of current period query responses and a count value of previous period query responses, the multicast group member comprised in the multicast group;

receive a first multicast leave message sent by a multicast group member, wherein the first multicast leave message carries a multicast group address;

delete a corresponding flow entry from the stored flow table according to the multicast group address and a port number that corresponds to the multicast group member;

encapsulate the first multicast leave message in order to obtain a second multicast leave message, wherein the second multicast leave message carries the multicast group address and the port number; and send the second multicast leave message to the controller, such that the controller deletes the port number from a multicast path.

11. The apparatus according to claim 10, wherein the instructions further cause the processor to:

receive a flow entry query message sent by the controller, wherein the flow entry query message carries a target flow table identifier and a target flow entry identifier;

acquire a corresponding query response count value from the stored flow table according to the target flow table identifier and the target flow entry identifier; and set the acquired query response count value as the count value of current period query responses and send the count value of current period query responses to the controller.

12. The apparatus according to claim 10, wherein before receiving the first multicast leave message, the instructions further cause the processor to:

receive a first multicast join message sent by the multicast group member, wherein the first multicast join message carries a multicast group address;

encapsulate the first multicast join message in order to obtain a second multicast join message, wherein the second multicast join message carries the multicast group address and a port number;

send the second multicast join message to the controller, wherein the controller creates a flow entry for the multicast group member according to the second multicast join message;

receive the flow entry sent by the controller; and store the flow entry in the stored flow table.

* * * * *

UNITED STATES PATENT AND TRADEMARK OFFICE
CERTIFICATE OF CORRECTION

| | | |
|---|---|---|
| PATENT NO. | : 9,998,293 B2 | Page 1 of 1 |
| APPLICATION NO. | : 15/335620 | |
| DATED | : June 12, 2018 | |
| INVENTOR(S) | : Chenji Li, Quancai Li and Bo Man | |

It is certified that error appears in the above-identified patent and that said Letters Patent is hereby corrected as shown below:

On the Title Page

Under Notice should read:
Subject to any disclaimer, the term of this patent is extended or adjusted under 35 U.S.C. 154(b) by 0 days.

Signed and Sealed this
Thirty-first Day of July, 2018

Andrei Iancu
*Director of the United States Patent and Trademark Office*